Sept. 8, 1936.   W. H. COONEY   2,053,944
PROTECTIVE DEVICE
Filed Oct. 28, 1935   2 Sheets-Sheet 1
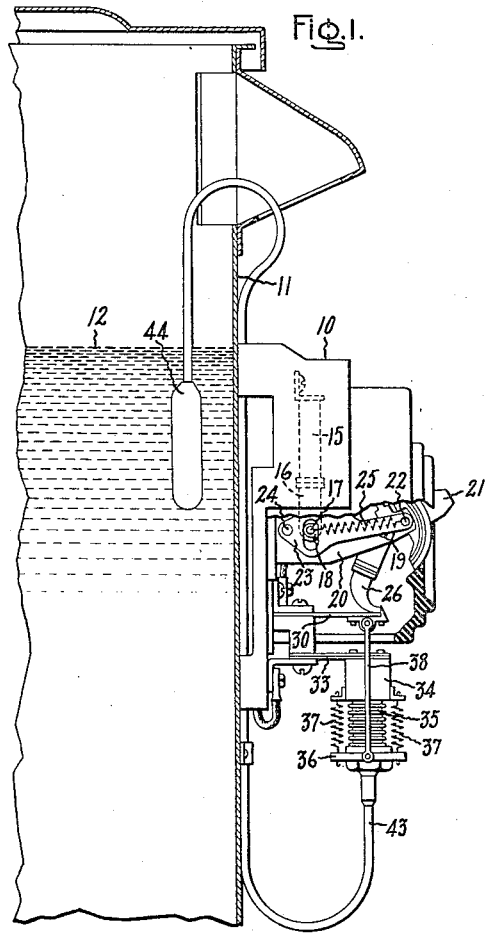
Fig.1.
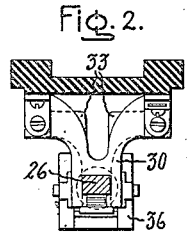
Fig.2.
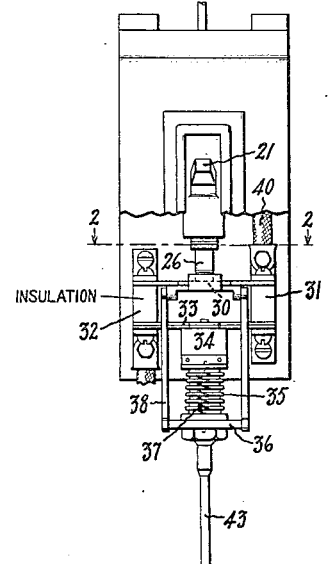
Fig.3.
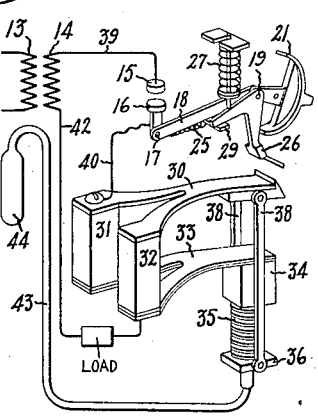
Fig.4.
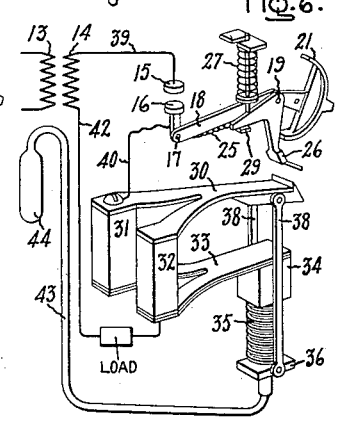
Fig.5.
Fig.6.
Inventor:
William H. Cooney,
by Harry E. Dunham
His Attorney.

Sept. 8, 1936.  W. H. COONEY  2,053,944
PROTECTIVE DEVICE
Filed Oct. 28, 1935  2 Sheets-Sheet 2
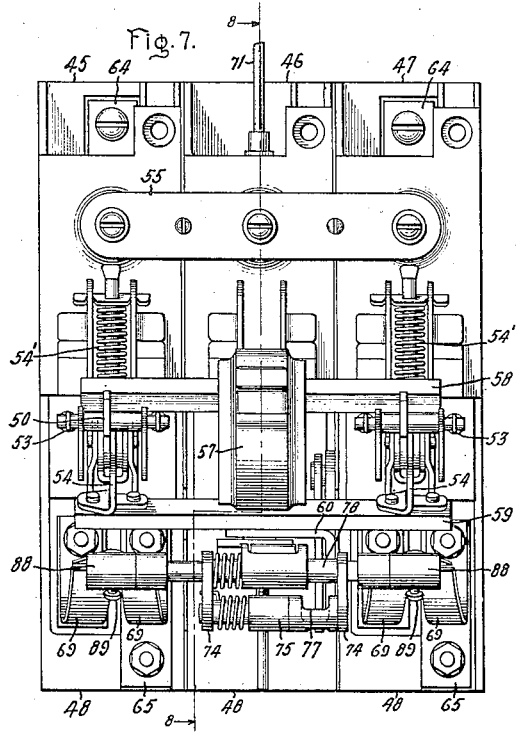
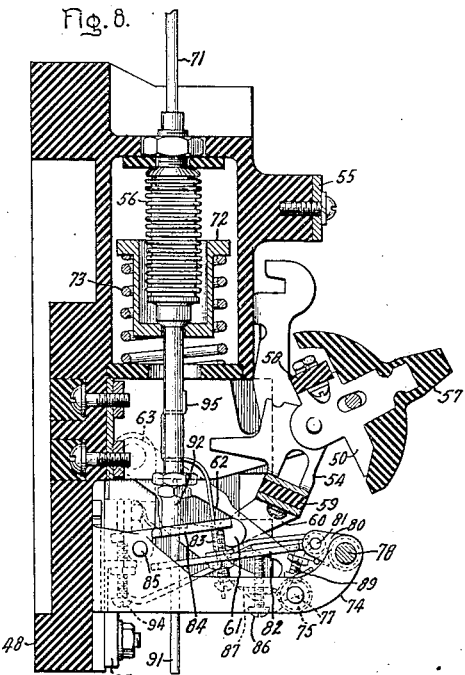
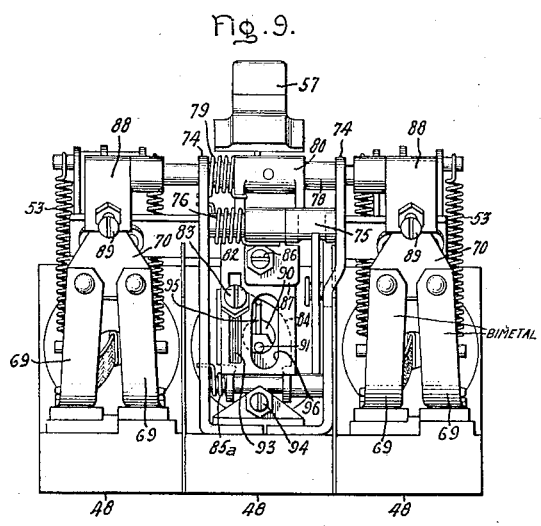
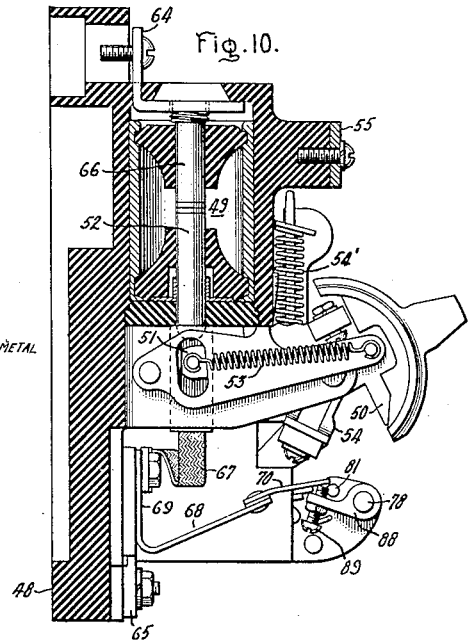
Inventor:
William H. Cooney,
by Harry E. Dunham
His Attorney.

Patented Sept. 8, 1936

2,053,944

UNITED STATES PATENT OFFICE 2,053,944

PROTECTIVE DEVICE

William H. Cooney, Pittsfield, Mass., assignor to General Electric Company, a corporation of New York Application October 28, 1935, Serial No. 47,191

10 Claims. (Cl. 200—81)

My invention relates to protective devices, more particularly to protective devices for electrical energy translating apparatus such as transformers, and has for an object the provision of a simple, reliable and inexpensive device of this type.

In accordance with accepted standards, electric transformers are given a continuous current rating which represents the maximum continuous load that may be imposed on the transformer without producing a temperature rise in the transformer windings in excess of the maximum temperature rise approved by the American Institute of Electrical Engineers. If the maximum peak load imposed on the transformer is limited to the transformer rating in accordance with the usual practice, it will be evident that during a large portion of the time that the transformer is in service, the transformer will carry considerably less than 100% load and, accordingly, the average temperature rise of the windings will be less than the permissible maximum. Some degree of overload can therefore be permitted for short times. While any increase in winding temperature will of course accelerate deterioration of the transformer insulation, the average transformer can be overloaded for short periods without appreciably affecting its life so long as the average temperature rise of the winding is not excessive.

It has heretofore been recognized that in order to utilize fully the load-carrying capacity of a transformer, means must be provided for limiting the load in accordance with the temperature rise of the winding rather than in accordance with the name-plate rating of the transformer. In the past, however, transformer operators have been overloading the transformers without satisfactory knowledge as to just how much of an overload the transformer could carry for any given time.

In order to provide adequate protection of a transformer, it is necessary to take into consideration two-temperature differentials, namely, the temperature rise of the transformer cooling oil over the ambient temperature and the temperature rise of the windings over the oil temperature. The sum of these two differentials represents the total temperature rise of the windings over the ambient temperature. At any particular time the first of these two differentials is dependent to a large extent on the average current that the transformer has been carrying immediately prior to the selected time, and the second differential depends to a large extent upon the current flowing at that particular time.

Protective devices responsive only to a fixed value of current have been found rather unsatisfactory when applied to transformers. Accordingly, it is a further object of my invention to provide a protective device which is responsive to the above-referred to temperature differentials and which is effective to remove the transformer from service when the temperature of the windings becomes dangerously high, regardless of the value of the current flowing in the windings at that particular time.

In carrying out my invention in one form, I provide a protective device for electrical energy translating apparatus comprising a thermal element movable in accordance with the value of the current flowing in the electrical apparatus and a second thermal element movable in accordance with the temperature of the apparatus. Means are provided for mechanically combining the separate movements of the two thermal elements, and means responsive to a predetermined combined or total movement are provided for controlling the apparatus. More specifically, I provide a circuit breaker for protecting an electric transformer of the self-cooled type, which circuit breaker is manually operable between open and closed circuit positions to control the connection of the transformer secondary winding to a suitable load circuit. The circuit breaker is provided with a thermal element arranged to be heated in accordance with the current flowing in the secondary winding and with a second thermal element which is responsive to the temperature of the transformer cooling medium. Each thermal element is movable independently of the conditions affecting the other element, and mechanical means are provided for additively combining the independent movement of the thermal elements. Tripping means are also provided for operating the circuit breaker to its open circuit position to disconnect the transformer from the load circuit upon the occurrence of a predetermined combined movement of the thermal elements.

For a more complete understanding of my invention, reference should now be had to the drawings in which Fig. 1 is an elevational view of a protective device embodying my invention applied to a distribution transformer of the oil-cooled type; Fig. 2 is a detailed sectional view taken along the line 2—2 of Fig. 3 which is a plan view of the circuit breaker shown in Fig. 1 with a portion of the circuit breaker cover broken away; Figs. 4, 5, and 6 are somewhat diagrammatic perspective views illustrating the operation of the protective device shown in Fig. 1 under different conditions of overload; Fig. 7 is a plan view of a preferred form of protective device embodying my invention; Fig. 8 is a sectional view taken along line 8—8 of Fig. 7; Fig. 9 is an end view of the device shown in Fig. 7, and Fig. 10 is a side view partly in section of the device shown in Fig. 7.

Referring now to Figs. 1 to 6 inclusive of the drawings, I have shown my invention in one form as applied to a circuit breaker 10 mounted on a wall of a transformer casing 11 which contains a body of suitable insulating medium such, for example, as oil, as indicated by the reference numeral 12. It will be understood, of course, that the transformer comprises a primary winding 13 and a secondary winding 14 shown diagrammatically in Figs. 4, 5, and 6, which windings are immersed in the body of oil 12, the secondary winding being connected to a suitable load circuit through the contacts of the circuit breaker in a manner to be more fully described hereinafter.

For purposes of illustration, I have shown a circuit breaker of the type described and claimed in the copending application of David C. Prince, Serial No. 7,085, filed February 18, 1935, entitled "Circuit breakers" which application is assigned to the same assignee as the present invention. For the purposes of the present invention, the circuit breaker 10 may be described as comprising a stationary contact 15 (Fig. 1) and a reciprocally movable contact 16, one end of which is secured by means of a pin 17 to the end of a suitable guide link 18. The other end (not shown) of this guide link 18 is pivotally secured to a pin 19 carried by a U-shaped frame 20, which frame is mounted on the circuit breaker base. Also pivoted on the pin 19, is an operating handle 21 which is arranged to operate a pin 22 supported on the free ends of a pair of levers 23, only one of which is shown, the other ends of the levers 23 being pivoted on a pin 24 carried by the frame 20. In order to operate the movable contact 16 of the circuit breaker between open and closed circuit positions with a snap action in response to movement of the handle 21, a pair of overcenter springs 25 are provided, only one of the springs being shown. As shown, the opposite ends of each overcenter spring 25 are respectively connected to the pins 22 and 17, and it will be apparent that when the operating handle 21 is moved about its pivot 19 in a clockwise direction from the position shown in Fig. 1, the pin 22 which is operated thereby will move one end of the spring 25 overcenter relative to the pivot pin 19, and, accordingly, the guide link 18 and the movable contact 16 will be operated to the open circuit position with a snap action. Similarly, when the operating handle 21 is returned to the position shown in the drawings, the movable contact 16 will be operated with a snap action to the closed circuit position shown.

The circuit breaker 10 is also provided with automatic means for operating the contact 16 to the open circuit position independently of the operating handle 21. As shown best in Figs. 4, 5, and 6, this automatic operating means comprises a tripping member 26 which is pivoted on the pin 19 and normally latched in the position shown against the bias of a tripping spring 27. As more fully described in the above-referred to Prince application, the tripping member 26 is provided with a portion 28 which is arranged to engage a member 29 carried by the guide link 18 so as to operate the movable contact 16 to its open circuit position when the tripping member 26 is released for operation by the spring 27.

Continuing now with the description of my invention, the tripping member 26 is normally held in its latched position by a latch spring 30 which is supported on a pair of blocks 31 and 32 secured to the circuit breaker base. As will be more fully pointed out hereinafter, the block 31 is formed of conducting material and the block 32 is formed of suitable insulating material. Also supported on the blocks 31 and 32, I provide a thermal element which comprises a U-shaped bimetallic element 33, the free end of which supports an insulating block 34. Carried by the insulating block 34, is a second thermal element which comprises an expansible bellows 35, the movable end of which is secured to an insulating disk 36 which is normally biased to the position shown in Figs. 1 to 4 inclusive by suitable springs 37. As shown, the disk 36 is connected to the free end of the latch spring 30 by a pair of operating levers 38. In order that the circuit breaker 10 may be responsive to the two above-referred to temperature differentials, the bimetallic element 33 is connected in the load circuit of the secondary winding 14 so as to be heated in accordance with the current flowing to the load. Referring to Fig. 4, this circuit may be traced from one terminal of the secondary winding 14 through the conductor 39, the stationary contact 15, the movable contact 16, a flexible conductor 40 which electrically connects the movable contact 16 to the conducting block 31, through the block 31, the U-shaped thermal element 33, the conductor 41, the load, and by way of the conductor 42 to the other terminal of the secondary winding. Thus, it will be seen that the bimetallic thermal element 33 is movable in accordance with the current flowing in the secondary winding.

As shown, the expansible bellows thermal element 35 is connected by means of a capillary tube 43 to a bulb 44 which is immersed in the body of oil 12 contained in the transformer casing. It will be understood, of course, that the bulb 44, the capillary tube 43 and the expansible bellows 35 are filled with a suitable expansible medium in accordance with the well-known practice, so that upon an increase in the oil temperature the bellows will be expanded against the bias exerted by the springs 37. Thus, it will be seen that the expansible bellows thermal element 35 is movable in accordance with the temperature of the transformer oil.

It is now believed that a complete understanding of my invention may be had from a description of the operation. Referring particularly to Figs. 4, 5 and 6, it will be seen that in these figures, the levers 23 of the circuit breaker have been omitted in order to simplify the drawings and a single overcenter spring 25 is shown as connected directly to a pin supported by the operating member 21. It will be understood, however, that the movable contact 16 is operated between its open and closed circuit positions with a snap action in response to movement of the operating handle 21 in substantially the manner described in connection with Fig. 1.

It will be assumed now that the transformer has been out of service for some time, and, accordingly, is in a relatively cool condition, and that the operating handle 21 has just been moved to the position shown in Fig. 4 to operate the contact 16 to its closed circuit position and connect the secondary winding 14 of the transformer to the load circuit. If it is assumed now that a relatively heavy overload occurs, it will be understood that the transformer windings will be quickly heated so that the temperature differential between the transformer windings and the cooling oil will increase at a greater rate than the temperature differential between the cooling oil and the ambient temperature. Accordingly, the bimetallic thermal element 33 which is arranged to be heated in accordance with the current flowing through the secondary winding 14 will be heated and after a predetermined time will be flexed so as to move the free end of the thermal element downwardly to the position shown in Fig. 5, carrying the insulating block 34 and the bellows 35 bodily therewith so as to move the operating levers 38 and operate the latch member 30 to the position shown in Fig. 5, whereupon the tripping member 26 is released to operate the movable contact of the circuit breaker to the position shown, thereby disconnecting the secondary winding 14 from the load. It will be understood, of course, that the time characteristic of the bimetallic element 33 is such that the tripping member 26 will be released only when the transformer windings approach a dangerously high temperature. During the time that elapses before the windings attain this dangerously high temperature, it will of course be apparent that the oil temperature will increase somewhat and therefore the bellows 35 will expand slightly. Therefore, it will be seen that the latch 30 is moved to release the tripping member 26 in accordance with the combined movement of the thermal element 33 and the thermal element 35.

It will be assumed now that the overload condition has been rectified and that sufficient time has elapsed to permit the thermal element 33 to cool and return to its normal shape. It will further be assumed that the operating handle 21 has been moved in the manner fully described in the above-referred to Prince application, first downward to engage and reset the tripping member 26 and then upward to return the movable contact 16 to the closed circuit position as shown in Fig. 4. If it is now assumed that a relatively light overload occurs, it will be apparent that the temperature of the transformer windings will increase slowly and due to the thermal relation between the transformer windings and the body of oil 12, the temperature of the oil will also increase. Under such light overload conditions, the thermal element 33 will not be heated sufficiently to effect release of the circuit breaker, even though the overload, if continued for a sufficiently long time, may endanger the winding. However, if this overload condition persists, the oil temperature will gradually rise and the bellows element 35 will be expanded to the position shown in Fig. 6, the operating levers 38 causing movement of the latch 30 to release the tripping member 26. Under these conditions, it will be apparent that while the bimetallic element 33 is flexed only slightly, the expansible bellows 35 is moved so as to increase the distance between the block 34 and the disk 36 sufficiently to move the latch member 30 to the position shown. As in the previous example described in connection with Fig. 5, it will be seen that the circuit breaker is tripped in accordance with the combined movement of the two thermal elements 33 and 35.

It will, of course, be understood that the operating positions shown in Fig. 5 and Fig. 6 represent the extreme conditions of relatively light and relatively heavy overload. For all intermediate conditions, the combined movement of the bimetallic element 33 and the expansible bellows 35 will be effective to cause release of the latch 30 when the temperature of the winding reaches a dangerously high value. Similarly it will be apparent that if the transformer has been in service for some time and the oil temperature has therefore attained some intermediate value so that the bellows 35 is partially expanded, a relatively small overload, effective to flex the bimetallic element 33 only a slight amount, will move the spring 30 sufficiently to release the latch.

In Figs. 7 to 10 inclusive, I have shown what is now considered to be the preferred embodiment of my invention. The circuit breaker here shown is particularly described and claimed in a copending application of Charles H. Hill, Serial No. 52,018 filed November 29, 1935, entitled "Protective device", which application is assigned to the same assignee as the present invention.

Referring now to Figs. 7 to 10 inclusive, the multiple circuit breaker shown comprises a plurality of individual single pole units 45, 46 and 47. As shown best in Fig. 10, each pole of the circuit breaker comprises a single pole unit of the type described and claimed in the above referred to Prince application, comprising a base 48 formed of insulating material for supporting a circuit interrupter 49 of the compression chamber type and an operating mechanism of the type described in connection with Figs. 1 to 6. As shown, this operating mechanism comprises an operating member 50, a guide link 51 secured to the movable contact 52 for operation by the overcenter springs 53 and a tripping member 54 biased by a tripping spring 54'.

Although I have shown in Fig. 7 three single pole units having their bases 48 suitably secured together, as for example, by a crossbar 55, it will be seen upon reference to Fig. 8 that only the outer single pole units 45 and 47 constitute poles of the circuit breaker, the center unit 46 being simply a skeleton unit, the compression chamber and all of the operating mechanism except the operating member 50 and the tripping member 54 being eliminated in this unit. As shown, the housing in the center single pole unit which is normally occupied by a compression chamber is utilized to support a bellows 56 in a manner to be more fully described hereinafter, and the operating member 50 of the center unit is provided with an insulated handle 57. Extending across the three single pole units is an insulated crossbar 58 which is secured to the operating members 50 of each of the units, and it will be apparent that when the handle 57 is operated to rotate the operating member 50 of the center unit 46 about its pivot, the crossbar 58 will be moved to rotate the operating members 50 of the two outer units 45 and 47 so as to operate the movable contacts 52 between open and closed circuit positions with a snap action by means of the overcenter springs 53.

Likewise a second insulated crossbar 59 extends across the three single pole units and is connected to the tripping members 54. This crossbar 59 is provided with a latching finger 60 (Fig. 8) which extends outwardly from the crossbar and is provided with a roller 61 which engages a slot 62 in a pivoted latch member 63. Thus it will be apparent that when the latch member 63 is moved so as to permit the roller 61 to move along the slot 62, the latch finger 60 carried by the crossbar 59 will be released for movement and the tripping members 54 associated with each pole of the circuit breaker will be released for operation to open the contacts of the circuit breaker in the manner described in connection with Figs. 1 to 6.

It will be understood, of course, that the circuit breaker may be connected in circuit with a transformer to be protected by connecting the terminals 64 of the pole units 45 and 47 respectively to the opposite ends of the transformer winding, and by connecting the terminals 65 of the pole units 45 and 47 to the load circuit. As shown best in Fig. 10, the circuit through each pole of the circuit breaker may be traced from the terminal 64 through the fixed contact 66, the movable contact 52, a flexible conductor 67 and a suitable thermal element 68 to the terminal 65. Each of the thermal elements 68 comprises a pair of bimetallic strips 69, the free ends of which are electrically and mechanically connected together by a conducting member 70.

Likewise, it will be understood that the bellows 56 is connected by means of a capillary tube 71 to a suitable bulb, not shown, which is immersed in the body of oil which surrounds the transformer windings. As shown in Fig. 8, one end of the bellows 56 is supported on the base 48 of the center unit 46, and the other end of the bellows engages a spring support 72 which is biased by a spring 73 so as to resist expansion of the bellows.

In order to provide for operation of the circuit breaker contacts to the open circuit position when the temperature rise of the transformer windings reaches a dangerous value, tripping mechanism is provided for releasing the latch member 63 in response to a predetermined combined movement of the bellows 56 and one or both of the thermal elements 68. This trip mechanism, as is more fully described in the above referred to Hill application, comprises a pair of spaced apart plates 74 secured to the base of the center unit 46 (Fig. 9), which plates support a rotatabe trip shaft 75 normally biased to the position shown in the drawings by a spring 76. This trip shaft 75 is provided with a latching portion which is cut away, as indicated best by the reference numeral 77 in Figs. 7 and 8.

As shown best in Fig. 8, the free end of the latch member 63 normally engages the trip shaft 75 and is restrained thereby from rotation about its pivot in a counterclockwise direction. It will be apparent, however, that when the trip shaft 75 is rotated in a counterclockwise direction, as viewed in Fig. 8, the latch member 63 will be released for rotation about its pivot in a counterclockwise direction, the end of the latch member 63 passing through the cut away portion of the shaft 75 so as to permit the roller 61 to move toward the right-hand end of the slot 62, as viewed in Fig. 8, and thereby permit operation of the tripping members 54 so as to move the circuit breaker contacts to the open circuit position.

Supported on the outermost ends of the plate 74 is an auxiliary shaft 78 which is normally biased to the position shown in the drawings by a spring 79 and which is provided intermediate the plates 74 with a bifurcated member 80, the arms of which extend outwardly from the shaft 78. Supported between the arms of the bifurcated member 80, is a pin 81 which pivotally supports one end of a movable lever 82. Adjacent its lower end, this lever 82 is provided with an extending adjustable member or screw 83, one end of which abuttingly engages a lever 84 which is pivotally mounted on a pin 85 and biased by a spring 85a (Fig. 9) to the position shown.

It will be apparent now that the lever 82 is mounted for pivotal movement about either of its ends. Thus when the shaft 78 is rotated so as to move the pin 81, it will be seen that the lever 82 is moved about a pivot point which is determined by the abutting engagement of the screw 83 with the lever 84. Likewise when the lever 84 is moved, it will be seen that the lever 82 will be pivoted about the pin 81, and therefore, the movement of the portion of the lever 82 intermediate the pin 81 and the screw 83 will be the resultant of the combined movement of the two ends of the lever 82. As shown in Fig. 8, this intermediate portion of the lever 82 is arranged to engage an adjustable screw 86 which is carried by an arm 87 extending outwardly from the trip shaft 75. Therefore, a predetermined movement of the lever 82 is effective to rotate the shaft 75 so as to release the latch member 63.

In order to rotate the shaft 78 in accordance with the movement of either or both of the thermal elements 68 so as to move one end of the lever 82 in accordance with the movement of the thermal elements, the shaft 78 is provided with outwardly extending ends each of which carries a trip finger 88 provided with an adjustable screw 89, one end of each screw being arranged for abutting engagement with the free end of one of the thermal elements 68.

Likewise, in order to move the lever 74 in accordance with the expansion of the bellows 56 so as to impart to the lever 82 a movement which corresponds to the movement of the bellows, the lever 84 is provided with an aperture 90 (Fig. 9) through which extends a rod 91, one end of which is connected to the movable end of the bellows 56. Adjustably secured to the rod 91, is a sleeve 92 which abuts against the lever 84 adjacent the aperture 90. Thus it will be seen that when the bellows 56 expands, the sleeve 92 will move the lever 84 about its pivot in a clockwise direction and thereby pivotally move the lever 82 about the pin 81.

It is believed that the operation of this embodiment of my invention will be apparent without a more detailed description. Upon the occurrence of overload condition, the increased current flowing through the thermal elements 68 will cause the thermal elements to flex and thereby rotate the shaft 78 so as to move the right-hand end of the lever 82 downwardly, as viewed in Fig. 8, and the heating of the transformer oil will cause the bellows 56 to expand so that the sleeve 92 pushes against the lever 84 and moves the left-hand end of the lever 82 downwardly, as viewed in Fig. 8. Upon a predetermined movement of the portion of the lever 82 intermediate the pin 81 and the screw 83, the trip shaft 75 will be rotated sufficiently due to the abutting engagement of the screw 86 with the intermediate portion of the lever 82 to release the latch member 63 and thereby cause operation of the circuit breaker contacts to the open circuit position.

It will be apparent that the load-time characteristic of the circuit breaker may be adjusted by varying the position of the screws 89 relative to the trip arms 88, by varying the position of the screw 86 relative to the arm 87 and by varying the distance that the screw 83 projects from the lever 82. In order further to calibrate the trip device, means are provided for adjusting the position of the screw 83 lengthwise of the lever 82. Thus, as shown in Fig. 9, the lever 82 is provided with an elongate slot 93 in which the screw 83 is movable as desired. Furthermore, an adjustable member 94 (Fig. 8) is provided for predetermining the initial position of the lever 84 about its pivot 85.

The circuit breaker may be reset after an automatic tripping operation by operating the handle 57 in a clockwise direction about its pivot from the position shown in the drawings to engage and depress the crossbar 59 so that the roller 61 carried by the latch finger 60 is moved along the slot 62 in the latch member 63 to return the latch member 63 to the position shown. If the trip shaft 75 has been returned to its normal position by the spring 76, the latch member 63 will be retained in this position and the circuit breaker contacts may then be reclosed by operating the handle 57 to the position shown in the drawings. It will be apparent, however, that until the thermal elements 68 and the bellows 56 have cooled sufficiently to return to their normal positions, the lever 82 will prevent the return of the trip shaft 75 to its normal position, and accordingly, the circuit breaker cannot be reclosed.

It will oftentimes be desirable to reclose the circuit breaker without waiting for the bellows 56 to return to its normal position, and accordingly, means are provided for temporarily disconnecting the bellows from the trip mechanism. As shown in Figs. 8 and 9, the aperture 90 in the lever 84 is sufficiently large to permit the sleeve 92 to pass therethrough. This sleeve 92 and the rod 91, however, are normally biased in a left-hand direction as viewed in Fig. 8 by a spring 95 to the position shown (Fig. 9) in which the sleeve member 92 is out of alignment with the aperture 90. One end of this spring 95 engages the rod 91 and the other end of the spring engages the upper end of a slot 96 in the lever 82. In order temporarily to disengage the bellows 56 from the trip mechanism, it is necessary only to move the outer end of the rod 91 in a right-hand direction, as viewed in Fig. 8, or in an upward direction, as viewed in Fig. 9, so as to bring the sleeve 92 into alignment with the aperture 90. Thereupon the sleeve 92 passes through the aperture 90, and accordingly, the bellows is no longer effective to prevent the return of the lever 82 to its normal position, shown in the drawings. As soon as the bellows 56 cools sufficiently, it will be apparent that the sleeve 92 will be retracted from the aperture 90 and will be moved by the spring 95 into abutting relation with the lever 84, as shown in the drawings.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A protective device for electrical translating apparatus comprising a thermal element movable in accordance with the current flowing in the apparatus, a second thermal element movable in accordance with the temperature of the apparatus, means for combining the individual movements of said thermal elements, and means responsive to a predetermined total movement of said thermal elements for controlling said apparatus.

2. A protective device for a transformer connected to supply a load, said device comprising a thermal element movable in accordance with the load current, a second thermal element movable in accordance with the temperature of said transformer, means for combining the separate movements of said thermal elements, and means responsive to a predetermined total movement of said thermal elements for disconnecting said load from said transformer.

3. A protective device for an oil cooled transformer comprising a thermal element movable in accordance with the current flowing in said transformer, a second thermal element movable in accordance with the temperature of the transformer oil, means for combining the separate movements of said thermal elements, and means responsive to a predetermined total movement of said thermal elements for controlling said transformer.

4. A protective device for an oil cooled transformer having a secondary winding connected to supply a load, said device comprising a thermal element movable in accordance with the load current, a second thermal element movable in accordance with the temperature of the transformer oil, means for combining the separate movements of said thermal elements, and means responsive to a predetermined total movement of said thermal elements for disconnecting said load from said transformer.

5. A protective device for an oil cooled transformer having a secondary winding connected to supply a load, said device comprising a thermal element responsive to the load current, a second thermal element responsive to the temperature of the transformer oil, a combining lever mounted for movement by said two thermal elements, and means responsive to a predetermined movement of said combining lever for disconnecting said load from said transformer winding.

6. A protective device for an oil cooled transformer having a secondary winding connected to supply a load, said device comprising a thermal element movable in accordance with the load current, a fluid filled expansible member, means for expanding said member in accordance with the temperature of the transformer oil, means for combining the expansion of said member and the movement of said thermal element to provide a total movement, and means responsive to a predetermined total movement of said member and said element for disconnecting said load from said transformer.

7. A protective device for an oil cooled transformer having a secondary winding connected to supply a load, said device comprising a bimetallic element connected in circuit with said load, whereby said element is movable in accordance with the load current, a liquid filled expansible bellows responsive to the temperature of the transformer oil, means for combining the expansion of said bellows and the movement of said bimetallic element to provide a total movement, and means responsive to a predetermined total movement of said bellows and said element for disconnecting said load from said transformer.

8. A protective device for an oil cooled transformer having a secondary winding connected to supply a load, said device comprising a bimetallic element heated in accordance with the load current, a fluid filled expansible member responsive to the temperature of the transformer oil, a combining lever, means for moving said lever in accordance with the combined movement of the bimetallic element and the expansible member, and means responsive to a predetermined movement of said lever for disconnecting said load from said secondary winding.

9. A circuit breaker for controlling a transformer having a winding immersed in a bath of insulating fluid, said circuit breaker comprising contacts connected in circuit with said winding, normally latched tripping means for automatically operating said contacts to an open circuit position, a thermal element movable in accordance with the current flowing in said winding, a second thermal element movable in accordance with the temperature of said insulating fluid, and means responsive to the combined movement of said thermal elements for releasing said tripping means to open said circuit breaker.

10. A circuit breaker for controlling a transformer having a winding immersed in a body of oil, said circuit breaker comprising contacts connected in circuit with said winding, manual means for operating said contacts between open and closed circuit positions, tripping means for operating said contacts to said open circuit position independently of said manual means, latch means for normally restraining said tripping means, a thermal element movable in accordance with the current flowing in said winding, a second thermal element movable in accordance with the temperature of said oil, and means responsive to the combined movement of said thermal elements for operating said latch means to release said tripping means, whereupon said circuit breaker is operated to said open circuit position.

WILLIAM H. COONEY.